United States Patent
Schiemenz et al.

(10) Patent No.: US 8,891,903 B2
(45) Date of Patent: Nov. 18, 2014

(54) METHOD, ARRANGEMENT, COMPUTER PROGRAM AND COMPUTER READABLE STORAGE MEDIUM FOR SCALING TWO-DIMENSIONAL STRUCTURES

(75) Inventors: Stefan Schiemenz, Kolkwitz (DE); Christian Hentschel, Cottbus (DE)

(73) Assignee: Brandenburgische Technische Universität Cottbus-Senftenberg, Cottbus (DE)

( * ) Notice: Subject to any disclaimer, the term of this patent is extended or adjusted under 35 U.S.C. 154(b) by 0 days.

(21) Appl. No.: 13/542,270

(22) Filed: Jul. 5, 2012

(65) Prior Publication Data
US 2013/0011082 A1 Jan. 10, 2013

(30) Foreign Application Priority Data
Jul. 6, 2011 (EP) .................................. 11172909

(51) Int. Cl.
*G06K 9/32* (2006.01)
*G06T 3/40* (2006.01)

(52) U.S. Cl.
CPC .................................. *G06T 3/4023* (2013.01)
USPC ........................................................ 382/298

(58) Field of Classification Search
None
See application file for complete search history.

(56) References Cited

U.S. PATENT DOCUMENTS

| | | | | |
|---|---|---|---|---|
| 6,018,753 A | * | 1/2000 | Kovacevic et al. | 708/313 |
| 6,323,905 B1 | * | 11/2001 | Kondo et al. | 348/441 |
| 6,646,684 B1 | * | 11/2003 | Kondo et al. | 348/447 |
| 7,184,066 B2 | * | 2/2007 | Elliot et al. | 345/694 |
| 7,525,526 B2 | * | 4/2009 | Brown Elliott et al. | 345/87 |
| 2005/0088385 A1 | | 4/2005 | Elliott et al. | |
| 2009/0028465 A1 | * | 1/2009 | Pan | 382/300 |
| 2009/0102855 A1 | * | 4/2009 | Brown Elliott et al. | 345/589 |
| 2009/0169128 A1 | * | 7/2009 | Hentschel et al. | 382/260 |
| 2010/0045695 A1 | * | 2/2010 | Brown Elliott et al. | 345/589 |

OTHER PUBLICATIONS

Leitao et al., Content-adaptive video up-scaling for high definition displays, May 2003, Proc. SPIE 5022, Image and Video Communications and Processing 03, pp. 612-622.*

Hentschel et al., Generic method for 2D image resizing with non-separable filters, Oct. 2004, International Conference on Image Processing (ICIP), vol. 3, pp. 1653-1656, Reference furnished through IDS.*

Schiemenz et al., Scalable high quality nonlinear up-scaler with guaranteed real time performance, Jun. 2010, 2010 IEEE 14th International Symposium on Consumer Electronics, pp. 1-6.*

(Continued)

*Primary Examiner* — Vu Le
*Assistant Examiner* — Guillermo Rivera-Martinez
(74) *Attorney, Agent, or Firm* — Henry M. Feiereisen LLC

(57) ABSTRACT

A method for scaling two-dimensional structures, which is especially usable for resizing digital 2D images with a rational scaling factor, is based on efficient implementation of a diamond-shaped filter. The conventional "1"-diamond matrices of variable size are replaced by a (m×n) coefficient matrix. For any given rational scaling factor, the computational load for calculating an output pixel is reduced to filtering (m×n) input pixels with a corresponding (m×n) filter matrix. The coefficients of this filter matrix depend from the phase of the output pixel to be calculated and the factor of interpolation, but are always integer numbers. The coefficients may be stored in lookup tables (LUT), which leads to a very efficient implementation of the inventive method. In one embodiment, a (3×3) coefficient matrix has been found to be advantageous.

12 Claims, 7 Drawing Sheets

(56) References Cited

OTHER PUBLICATIONS

Hentschel, C.: "Generic method for 2D image resizing with non-separable filters", 2004 International Conference on Image Processing (ICIP), Singapore, Oct. 24-27, 2004, Proceedings Oct. 24, 2004, p. 1653-1656, XP010786076, DOI:10.1109/ICIP.2004.1421387, ISBN:987-0-7803-8554-2.

Hentschel, C. et al.: "High Quality, Low Complexity Image Scaler Suitable for Rational Factors", Consumer Electronics 2006. ICCE'06. 2006 Digest of Technical Papers. International Conference in Las Vegas, NV, USA, Jan. 7-11, 2006, 2006 IEEE, Jan. 7, 2006, pp. 179-180, XP010896563, DOI: 10.1109/ICCE.2006.1598369, ISBN: 978-0-7803-9459-9.

* cited by examiner

METHOD, ARRANGEMENT, COMPUTER PROGRAM AND COMPUTER READABLE STORAGE MEDIUM FOR SCALING TWO-DIMENSIONAL STRUCTURES

CROSS-REFERENCES TO RELATED APPLICATIONS

This application claims the priority of European Patent Application Serial No. 11 172 909.1, filed Jul. 6, 2011, pursuant to 35 U.S.C. 119(a)-(d), the content of which is incorporated herein by reference in its entirety as if fully set forth herein.

BACKGROUND OF THE INVENTION

The present invention relates to a method, an arrangement, a computer program and a computer-readable storage medium for scaling two-dimensional structures, which is especially usable for resizing digital 2D images with a rational scaling factor.

The following discussion of related art is provided to assist the reader in understanding the advantages of the invention, and is not to be construed as an admission that this related art is prior art to this invention.

From conventional solutions is known a method for scaling (resizing) images by rational scaling factors. 2D image resizing is an important issue for pixel oriented displays with variable input formats. A special problem arises if low-resolution pictures shall be displayed on high-resolution screens, especially when only simple up-conversation methods like pixel and line repetition or bi-linear interpolation is used. Even when applying separable polyphase up-conversion filters, the problem of jagged lines (staircases) remains.

One of the conventional approaches for image scaling is shown in FIG. 1. According to the conventional scaling in a first step the input signal is interpolated with a factor L, then the resulting signal is filtered by a 2D low pass filter, and finally the signal is reduced by a factor M. FIG. 1 depicts a conventional method using a special filter, a so-called diamond filter. The up-scaling by a factor L includes pixel and line repetition in the source image by the factor L, which is known as sample and hold (S & H) (in FIG. 1 a factor L=3 is illustrated). Then a non-separable so-called diamond-shaped filter with identical coefficients is used followed by a down-sampling step by a factor M, therefore realizing a rational scaling factor L/M.

Another prior art resizing method uses very simple, non-separable filters, and which is suitable for image and video material such as analogue sources (PAL [=Phase Alternation Line], NTSC [=National Television Systems Committee]), digital sources (JPEG [=Joint Photographic Experts Group], MPEG [=Moving Picture Experts Group]), low-resolution up to high-resolution images, and noisy pictures. An essential feature of the method is that for calculation of a pixel of the target image only a (limited) maximal number of adjacent pixels of the source image is necessary. This is reached by using a so-called diamond-shaped filter. However, the size of the used diamond-shaped filter has a quadratic dependence of the factor of interpolation. Thus, also the computational load increases as the square of the factor of interpolation.

It has been also been reported that for several factors of interpolation the computational load converges towards a limit. However, the computational load still remains high.

It would therefore be desirable and advantageous to obviate prior art shortcomings and to provide an improved method, an arrangement, a computer program and a computer-readable storage medium for scaling two-dimensional structures, which more particularly reduces the arithmetic operations to a pre-definable fix value.

SUMMARY OF THE INVENTION

According to one aspect of the present invention, a method for scaling two-dimensional structures, wherein a source structure is transformed into a target structure and the source and target structure are each constructed from regularly arranged structure elements, includes the steps of defining a first scheme comprising structure elements $P_{ij}$ associated with the source structure and arranged in m rows and n columns, subdividing at least a portion of the structure elements $P_{ij}$ of the first scheme into sub-structure elements arranged in p rows and q columns, with each row and each column having a corresponding sub-structure element $P^S_{kl}$, defining a second scheme $P^D$ comprising a subset of the sub-structure elements $P^S_{kl}$ and at least one distinguished sub-structure element $P^{D*}$, superposing the first scheme with the second scheme $P^D$ so as to overlap the at least one distinguished sub-structure element $P^{D*}$ step-by-step with at least a portion of the sub-structure elements $P^S_{kl}$ of the first scheme, for each step of superposing, constructing a coefficient matrix $H^{kl}_{adapt}$ assigned to the sub-structure element $P^S_{kl}$ of the first scheme, with which the distinguished sub-structure element $P^{D*}$ is overlapped, wherein the coefficients $h^{kl}_{ij}$ of the coefficient matrix $H^{kl}_{adapt}$ define a weight of the structure element $P_{ij}$ of the i-th row and j-th column of the first scheme, and defining a structure element of the target structure by evaluating at least a portion of the structure elements $P_{ij}$ of the first scheme and at least a portion of the matrices $H^{kl}_{adapt}$.

With the method according to the present invention, the computational load during scaling of images, especially the computational load for calculating an output structure element, for example a pixel, is reduced and does not longer depend from the factor of interpolation. Two-dimensional structures are advantageously scaled (or resized) by transforming a source structure into a target structure. Source and/or target structure may be analogue and/or digital structures, such as for example well known analogue or digital image or video material. The two-dimensional structures are regularly built up of structure elements, preferably arranged in rows and columns. The structure elements may be pixels for example. Advantageously, the structure elements $P_{ij}$ of the first scheme correspond to adjacent structure elements of the source structure. It has been found advantageous when the first scheme is a quadratic scheme, i.e. when m=n, for example: m=n=3.

According to an advantageous feature of the present invention, at least one structure element $P_{ij}$, preferably all structure elements of the first scheme are subdivided in sub-structure elements $P^S_{kl}$, where the sub-structure elements $P^S_{kl}$ are arranged in p rows and q columns. Further, there is defined a second scheme $P^D$, which corresponds to a subset of sub-structure elements $P^S_{kl}$. In an advantageous embodiment of the invention, the second scheme comprises p*q sub-structure elements $P^D_{kl}$. In another advantageous embodiment of the invention the sub-structure elements $P^D_{kl}$ of the second scheme are arranged diagonally, therefore forming a so-called diamond-shaped filter. In yet another advantageous embodiment, the second scheme $P^D$ corresponds to all sub-structure elements $P^S_{kl}$ of one structure element of the first scheme, rotated by 45°. One of the sub-structure elements $P^D_{kl}$ is chosen as a distinguishing element $P^{D*}$. Advantageously, for reasons of symmetry, the distinguishing element $P^{D*}$ is the center of rotation.

According to an advantageous feature of the present invention, the first and second scheme are superposed in a sequence of steps in such a way that the distinguishing element $P^{D*}$ in each step coincides with a single sub-structure element $P^S_{kl}$ of the first scheme. In an advantageous embodiment of the invention, the distinguishing element $P^{D*}$ in each step coincides with a single sub-structure element $P^S_{kl}$ of a single structure elements $P_1$ of the first scheme. The distinguishing element $P^{D*}$ in the sequence of steps then coincides with at least a part of the sub-structure elements $P^D_{kl}$ of the first scheme or advantageously with at least a part of the sub-structure elements $P^S_{kl}$ of a single structure element $P_{ij}$ of the first scheme. According to an advantageous feature of the present invention, the distinguishing element $P^{D*}$ coincides with all sub-structure elements $P^S_{kl}$ of a single structure element $P_{ij}$ of the first scheme.

According to an advantageous feature of the present invention, in each step of superposing a matrix $H^{kl}_{adapt}$ of coefficients $h^{kl}_{ij}$ is assigned to that sub-structure element $P^S_{kl}$ of the first scheme, which coincides with the distinguished sub-structure element $P^{D*}$. The coefficients $h^{kl}_{ij}$ of the matrix $H^{kl}_{adapt}$ represent a weight. In an advantageous embodiment, the weights indicate a measurement of the area of the structure element $P_{ij}$ of the i-th row and j-th column of the first scheme, which is covered by the sub-structure elements $P^D_{kl}$ of the second scheme $P^D$. In another advantageous embodiment of the invention, the coefficients $h^{kl}_{ij}$ represent the number of sub-structure elements $P^D_{kl}$ of the second scheme, which falls into the structure element $P_{ij}$ of the first scheme. The matrix $H^{kl}_{adapt}$ consists of a fixed number of m rows and n columns. In a preferred embodiment it is a (3×3) matrix. If the number of sub-structure elements $P^D_{kl}$ of the second scheme, which falls into the structure element $P_{ij}$ of the first scheme, is used as measurement for the covered area, the coefficients $h^{kl}_{ij}$ are integers. It should be noted that the dimension of the matrix $H^{kl}_{adapt}$ does not depend from the factor of interpolation. The number of sub-structure elements $P^D_{kl}$ of the second scheme (which corresponds to the factor of interpolation) or the number p and q of rows and columns do only affect the coefficients $h^{kl}_{ij}$ but not the dimension of the matrix $H^{kl}_{adapt}$. Thus, the computational load is independent from the factor of interpolation. Moreover, there are only at the most p*q different matrices $H^{kl}_{adapt}$.

According to an advantageous feature of the present invention, these (at the most p*q different) matrices $H^{kl}_{adapt}$ are calculated in advance and stored in a memory of a data processing unit, therefore, preventing a new calculation of the matrix $H^{kl}_{adapt}$ in each step of the transformation from the source structure (image) into the target structure (image). According to an advantageous feature of the present invention, in each step of superposing the matrix $H^{kl}_{adapt}$ corresponding to the sub-structure element $P^S_{kl}$, which coincides with the distinguishing element $P^{D*}$, is read from the storage.

According to an advantageous feature of the present invention, a structure element of the target structure is calculated with the help of the structure elements of the source structure and the matrices $H^{kl}_{adapt}$. In one advantageous embodiment of the invention, the structure elements of the target structure are calculated in the following way:

subdividing at least a part, preferably all, structure elements $F^S(x, y)$ of the source structure into p rows and q columns, with one sub-structure element $F^S_{kl}(x,$ in each row and line, associating each sub-structure element $F^S_{kl}(x, y)$ with the matrix $H^{kl}_{adapt}$, for each structure element $F^S(x, y)$ of the source structure considering the structure element $F^S(x_i,$ $y_j)$ (i=0, 1, ..., m; j=0, 1, ..., n) of the source structure, which correspond to the structure elements $P_{ij}$ of the first scheme, depending from the scaling factor, for each structure element $F^T(v, w)$ of the target structure choosing a sub-structure element $F^S_{kj}(x, y)$ of the source structure, which forms the basis for the calculation of the structure element $F^T(v, w)$, calculating a structure element $F^T(v, w)$ of the target structure as the normalized sum of structure elements $F^S(x_i, y_j)$, where each structure element $F^S(x_i, y_j)$ is weighted by the coefficient $h^{kl}_{ij}$ of the matrix $H^{kl}_{adapt}$.

According to an advantageous feature of the present invention, at least the parameter p and q for subdividing the structure elements $F^S(x, y)$ of the source structure (and for subdividing the structure elements $P_{ij}$ of the first scheme) and the number of steps as well as the step size of the superposition are defined depending from the scaling factor. Assuming, the scaling factor is defined by L/M, where L and M are integers, and L>M, then in a preferred embodiment of the invention, structure elements $F^S(x, y)$ of the source structure (and structure elements $P_{ij}$ of the first scheme) are subdivided into L rows and L columns, the distinguishing element $P^{D*}$ of the second scheme is superimposed with every M-th sub-structure element $F^S_{kl}(x, y)$ in a row of the source structure. Thus, superimposing proceeds with a step size of M. After the superimposing has reached the end of a row k, it is continued in row k+M. For each such covered sub-structure element $F^S_{kl}(x, y)$ a structure element of the target structure is calculated by evaluating the structure elements $F^S(x_i, y_j)$ of the source structure and the matrix $H^{kl}_{adapt}$.

According to another aspect of the invention, an arrangement according to the invention for scaling two-dimensional structures includes at least one data processing unit and is configured such that a source structure is transformed into a target structure, wherein the source and target structure are regularly made up of structure elements, wherein the data processing unit is configured to carry out the aforementioned method steps of:

defining a first scheme comprising structure elements $P_{ij}$ associated with the source structure and arranged in m rows and n columns, subdividing at least a portion of the structure elements $P_{ij}$ of the first scheme into sub-structure elements arranged in p rows and q columns, with each row and each column having a corresponding sub-structure element $P^S_{kl}$, defining a second scheme $P^D$ comprising a subset of the sub-structure elements $P^S_{kl}$ and at least one distinguished sub-structure element $P^{D*}$, superposing the first scheme with the second scheme $P^D$ so as to overlap the at least one distinguished sub-structure element $P^{D*}$ step-by-step with at least a portion of the sub-structure elements $P^S_{kl}$ of the first scheme, for each step of superposing, constructing a coefficient matrix $H^{kl}_{adapt}$ assigned to the sub-structure element $P^S_{kl}$ of the first scheme, with which the distinguished sub-structure element $P^{D*}$ is overlapped, wherein the coefficients $h^{kl}_{ij}$ of the coefficient matrix $H^{kl}_{adapt}$ define a weight of the structure element $P_{ij}$ of the i-th row and j-th column of the first scheme, and defining a structure element of the target structure by evaluating at least a portion of the structure elements $P_{ij}$ of the first scheme and at least a portion of the matrices $H^{kl}_{adapt}$.

According to another aspect of the invention, a computer program and a computer-readable storage medium having stored thereon program instructions can be loaded into the memory of a computer, enabling a data processing system to execute the aforedescribed method for scaling two-dimensional structures.

Such computer programs can be provided, for example, (fee-based or free of charge, freely accessible or password-protected) for downloading in a data or communication network. The provided computer programs may also be downloaded from an electronic data network, for example from the Internet, to a data processing system connected to the data network.

Thus, the invention provides an efficient implementation of a diamond-shaped filter. According to an advantageous feature of the present invention, the conventional "1"-diamond matrices of variable size are replaced by a (m×n) matrix of coefficients, where an embodiment with m=n=3 has been found as an advantageous approach. For any given rational scaling factor, the computational load for calculating of an output pixel is reduced to filtering of (m×n) input pixel with a corresponding (m×n) filter matrix. The coefficients of this matrix depend from the phase of the output pixel to be calculated and from the factor of interpolation, where, however, in any case the coefficients are integers. In the case of m=n=3 at maximum a number of seven multiplications are necessary for calculating an output pixel. Advantageously, the coefficients are stored in lookup tables (LUT), which leads to a very efficient implementation of the inventive method.

According to another advantageous feature of the present invention, only visible output pixels are calculated, therefore reducing the storage to the size of the output image.

The present invention is usable within TV sets, stationary or mobile displays, in the area of printing, within software for image processing for example.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
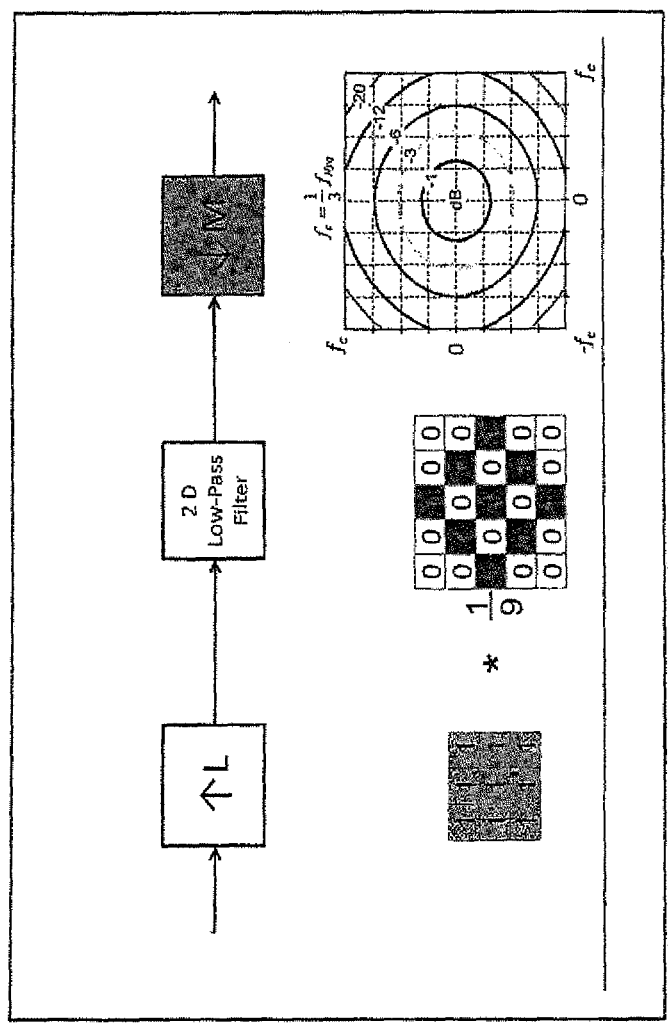
FIG. 1 shows a the principle of scaling with a diamond-shaped filter according to the state of the art.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
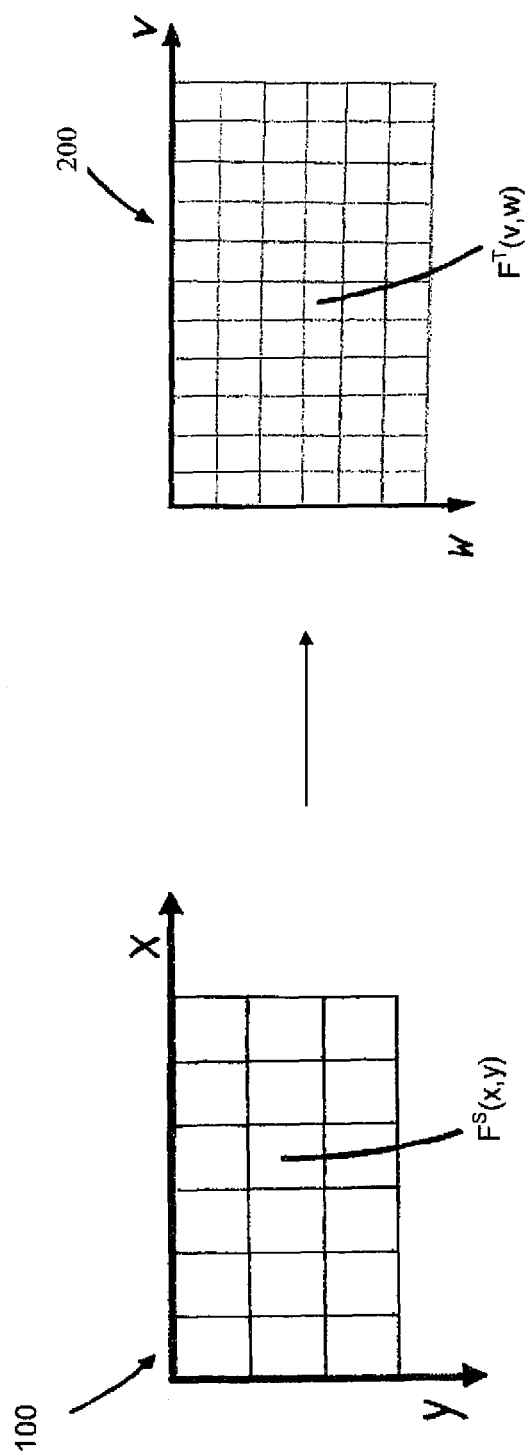
FIG. 2 shows a schematic illustration of a transformation of a source image into a target image.

Turning now to the drawing, and in particular to FIG. 2, there is shown a source image 100 consisting of pixels $F^S(x, y)$, which is transformed by scaling into a target image 200 consisting of pixels $F^T(v, w)$. The pixels $F^S(x, y)$, $F^T(v, w)$ are arranged in rows and lines.

Figure 3A:
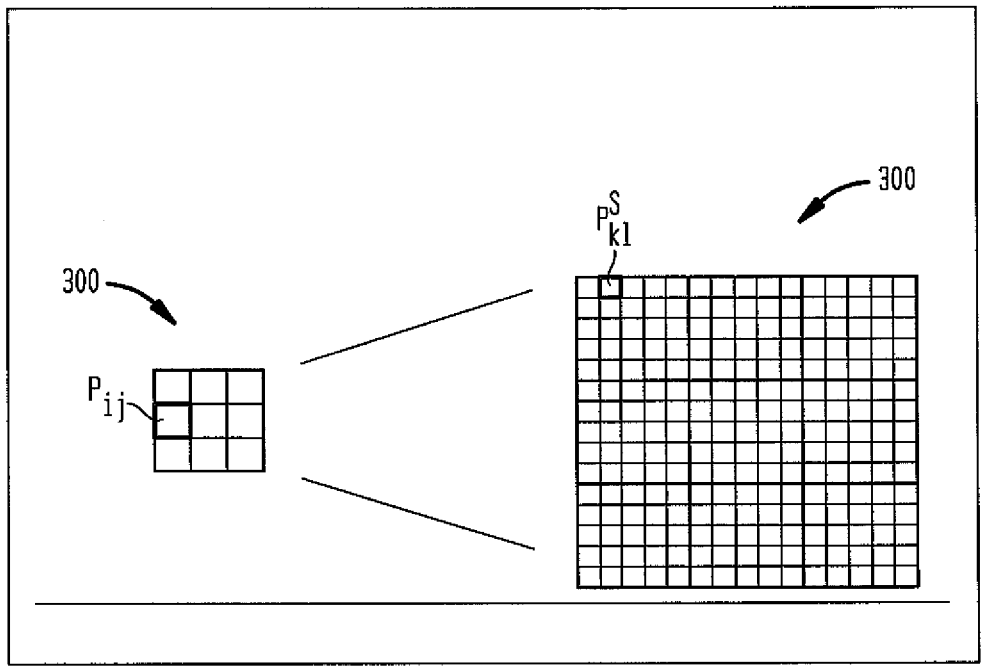
FIGS. 3a-e show a schematic process flow of an exemplified embodiment.

Referring to FIGS. 3a to 3e, an exemplary embodiment of the inventive scaling method is described. In a first step a first scheme 300 is chosen, which corresponds to a part of the source image 100, for example to a 3×3 block of pixels $F^S(x+i, y+j)$ (i, j=0, 1, 2), as depicted in FIG. 3a. The first scheme 300 comprises nine structure elements $P_{ij}$ (i, j=0, 1, 2). However, it should be noted that the block size may vary depending from circumstances.

Assuming, the scaling factor is a rational factor defined by L/M, where L and M are integers, and L>M, then in a preferred embodiment of the invention, structure elements $P_{ij}$ of the first scheme 300 are subdivided into L rows and L columns, resulting in L*L sub-structure elements $P^S_{kl}$.

Since the inventive method is described with the help of a scaling by the factor 5/3, the structure elements $P_{ij}$ of the first scheme 300 are subdivided into 5 rows and 5 columns as depicted in FIG. 3a.

In a next step, the second scheme is defined. According to the exemplified embodiment, the second scheme results from a rotation of the sub-structure elements $P^S_{kl}$ of one structure element $P_{ij}$ of the first scheme 300 by 45°. Such a second scheme is called diamond-shaped filter 400. The diamond-shaped filter 400 comprises a distinguishing element $P^{D*}$ at the center of the diamond-shaped filter 400.

Figure 3B:
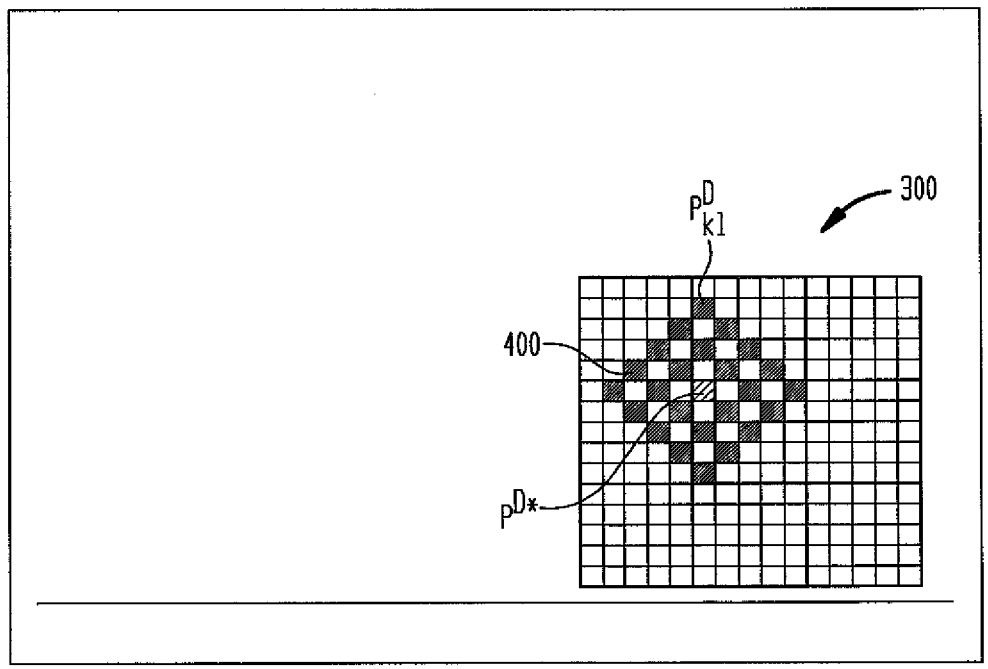
Figure 3C:
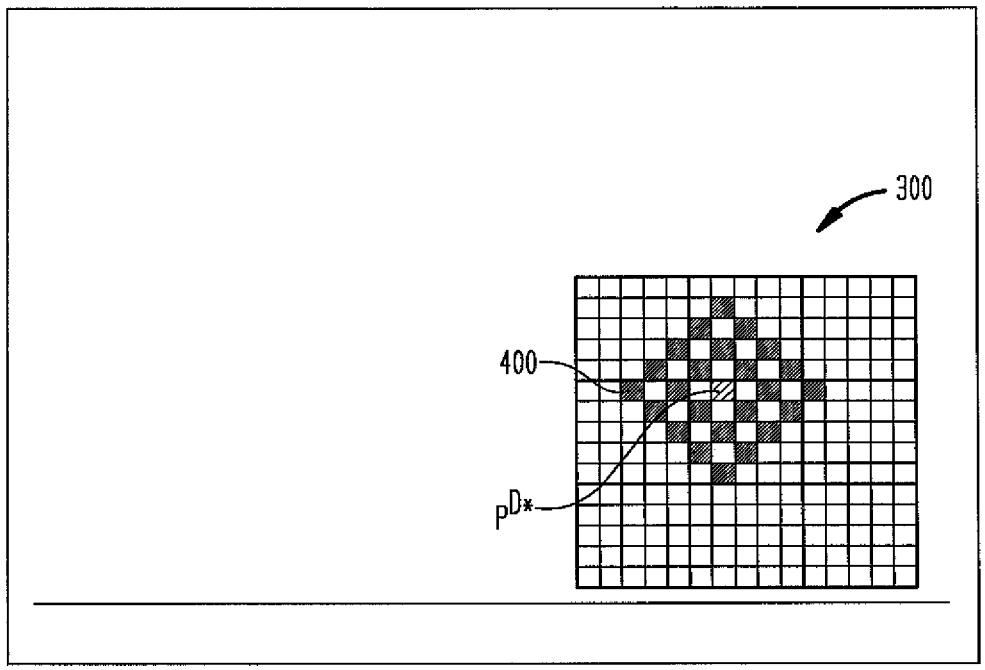
Figure 3D:
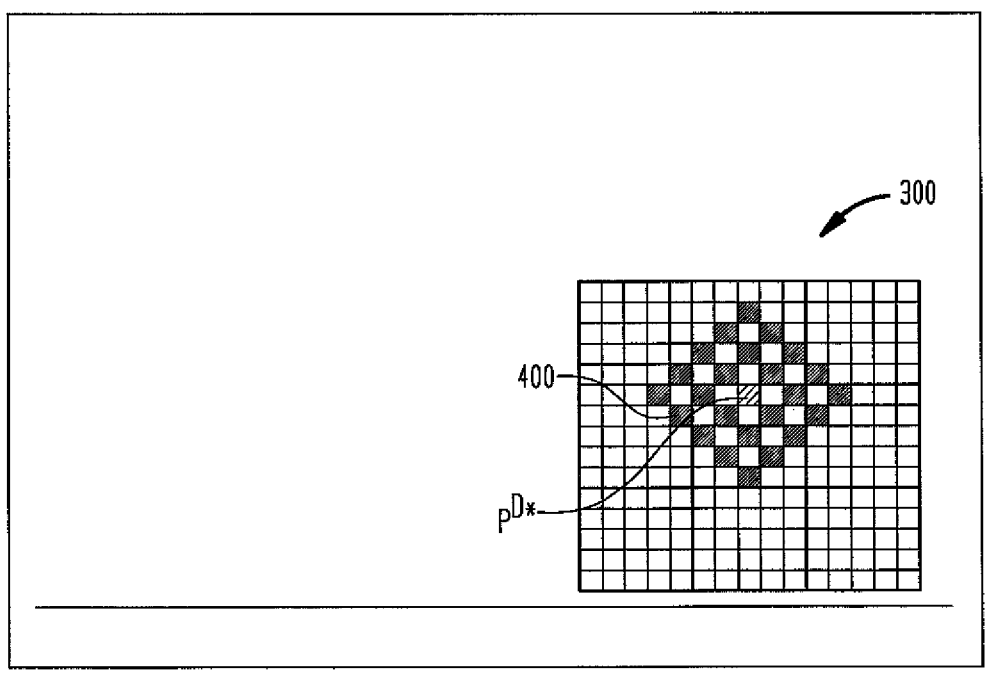
Figure 3E:
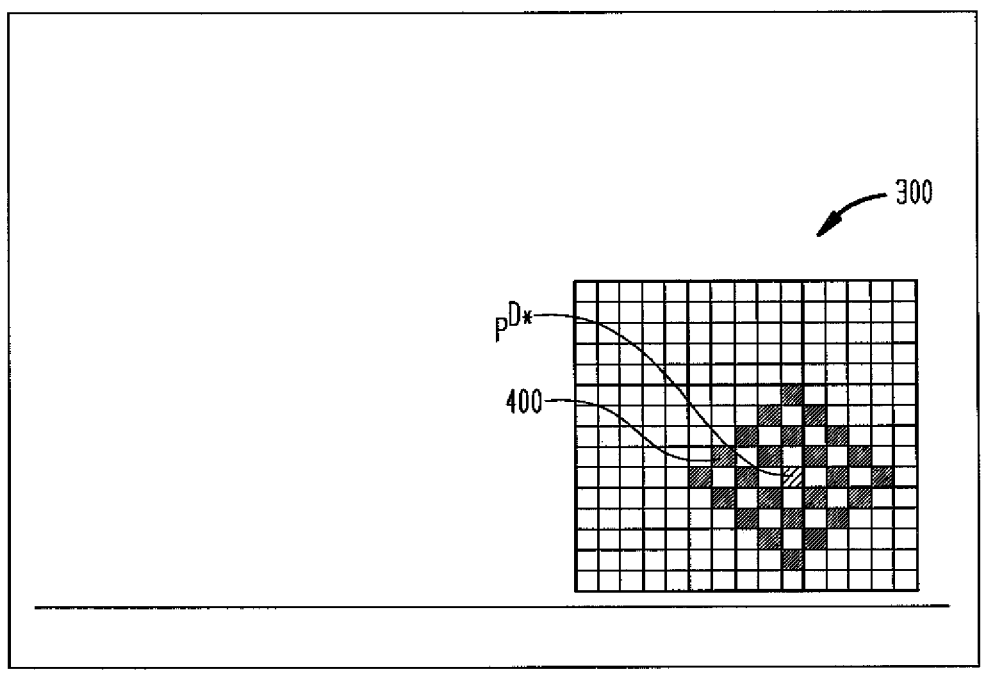
Figure 5:
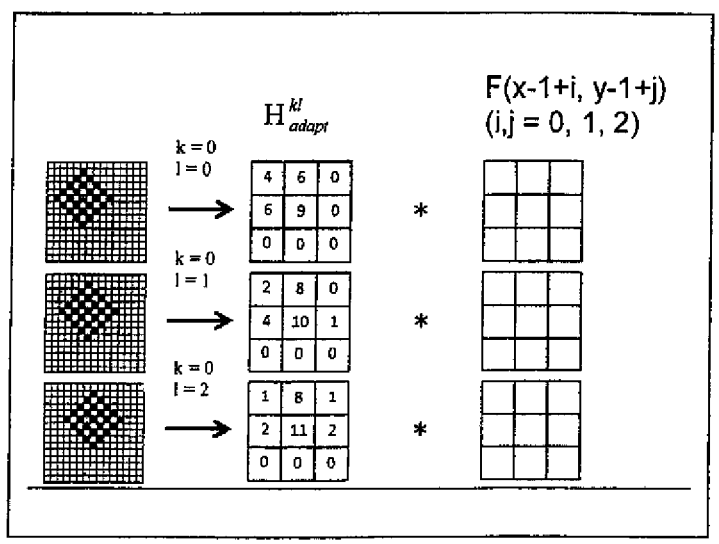
FIG. 5 shows the relation between the matrices $H^{kl}_{adapt}$ and the corresponding sub-pixels $P^S_{kl}$.

With the help of the first scheme 300 and the diamond-shaped filter 400 the L*L matrices $H^{kl}_{adapt}$ are calculated as shown in FIGS. 3b to 3e. In detail, the distinguishing element $P^{D*}$ is stepwise superposed to each and every sub-structure element $P^S_{kl}$ of the central structure element $P_{11}$ of the first scheme 300. In each step it is determined, how many sub-structure elements $P^D_{kl}$ of the diamond-shaped filter 400 fall in each structure element $P_{ij}$ of the first scheme 300. This number constitutes the coefficient $h^{kl}_{ij}$ of the matrix $H^{kl}_{adapt}$. From the step, which is depicted in FIG. 3b, the matrix $H^{00}_{adapt}$ is derived with coefficients $h^{00}_{00}=4$, $h^{00}_{01}=h^{00}_{10}=6$, $h^{00}_{11}=9$ and $h^{00}_{02}=h^{00}_{12}=h^{00}_{20}=h^{00}_{21}=h^{00}_{22}=0$ (see also FIG. 5). This procedure is done for all sub-structure elements $P^S_{kl}$ of the central structure element $P_{11}$ of the first scheme 300. That way 25 matrices $H^{kl}_{adapt}$ (k, l=0, 1, ..., 4) are calculated.

It should be noted that the number of matrices depends from the value L, however, the dimension of the matrices only depends on the number of rows and columns of the first scheme 300, which is independent from the scaling or interpolation factor.

The step of determining the matrices $H^{kl}_{adapt}$ is performed in advance, and the determined matrices $H^{kl}_{adapt}$ are stored in a storage area, preferably in LUT's, of a data processing unit. The matrices $H^{kl}_{adapt}$ are calculated with the help of the first scheme 300 and the diamond-shaped filter 400, preferably without any relation to an actual source image, since the matrices $H^{kl}_{adapt}$ are independent from such a source image content.

In the following, the generation of the target image 200 will be described:

Being supposed a scaling factor of L/M, then, after subdividing all pixels $F^S(x, y)$ of the source image 100 into L*L sub-pixels, for each M-th sub-pixel in the first row of the source image 100 a pixel $F^T(v, 0)$ of the target image 200 is calculated. The pixels $F^T(v, 0)$ of the target image 200 calculated in this step represent the first row $F^T(v, 0)$ of the target image 200.

The next column $F^T(v, 1)$ of the target image 200 is calculated by evaluating every M-th sub-pixel in the (M+1)-th row of the source image 100, and so on.

Figure 4:
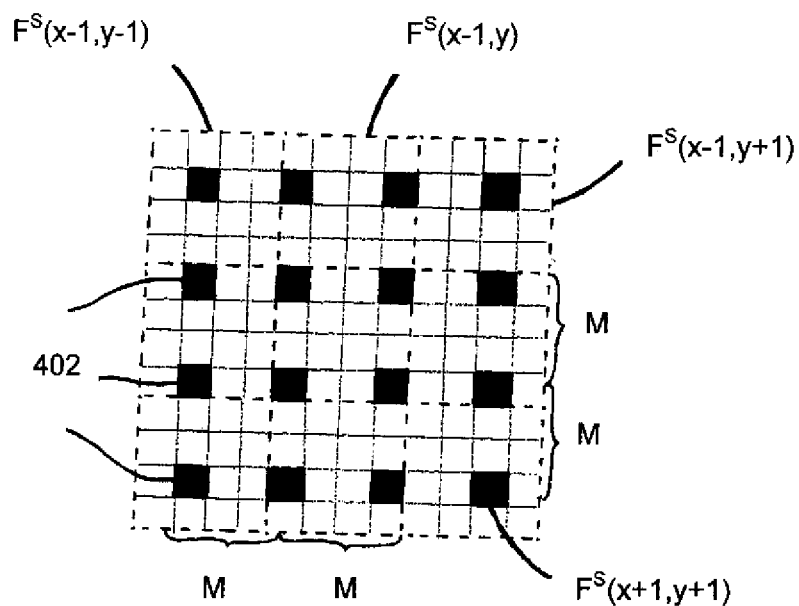
FIG. 4 shows an exemplified section of the source image (a 3×3 block of pixels) and its subdivision into sub-pixels.

This means that every M-th row of the source image 100 is scanned with a step size of M within each such row. From each scanned sub-pixel a pixel $F^T(v, w)$ of the target image 200 is calculated. It should be noted that this is equivalent to calculating the target image by scanning every M-th column of the source image 100 with a step size of M within each such column. The principle is illustrated in FIG. 4 with L=4 and M=3: there subdivision of pixels $F^S(x+i, y+j)$ (i=−1, 0, 1; j=−1, 0, 1) of the source image 100 into 16 sub-pixels (L=4 in this case) is depicted. Pixel 402, which serves as a basis for calculation of a target pixel $F^T(v, 1)$ of the target image 200 are distributed over the sub-pixels of the source image as a raster with step size of M=3.

In a preferred embodiment of the invention, the pixels of the target image 200 are calculated, where the pixels $F^S(x, y)$ of the source image 100 and the phase, i.e. the row and column of the sub-pixel within the pixel $F^S(x, y)$, is evaluated. In this embodiment a pixel $F^T(v, w)$ of the target image 200, which is calculated on the basis of the pixel $F^S(x, y)$ of the source image 100 and the phase, which is given by the k-th column and the l-th row, is designed by $F^T(F^S(x, y) k, l)$ and calculated as follows:

$$F^T(F^S(x, y)k, l) = \frac{1}{L^2} \cdot \sum_{\mu=0}^{2} \sum_{\nu=0}^{2} h^{kl}_{\mu\nu} \cdot F^S(x-1+\mu, y-1+\nu). \quad (1)$$

The matrix $H^{kl}_{adapt}$ depends only from the phase (k, l), i.e.:

$$H^{kl}_{adapt} = \begin{bmatrix} h^{kl}_{00} & h^{kl}_{01} & h^{kl}_{02} \\ h^{kl}_{10} & h^{kl}_{11} & h^{kl}_{12} \\ h^{kl}_{20} & h^{kl}_{21} & h^{kl}_{22} \end{bmatrix}.$$

The coefficients $h^{kl}_{ij}$ can be determined as follows:
In a first step values $$L_1(n) = \frac{n(n+1)}{2} \text{ and } L_2(n) = \left\lfloor \frac{(n+1)^2}{4} \right\rfloor \quad (0 \le n \le (L-1))$$

are determined.
With theses values, the coefficients $h^{kl}_{ij}$ can be calculated as follows:

$h^{kl}_{00} = L_2(n)$ with $n = L-2-(k+l)$ $h^{kl}_{02} = L_2(n)$ with $n = k-l-1$ $h^{kl}_{20} = L_2(n)$ with $n = l-k-1$ $h^{kl}_{22} = L_2(n)$ with $n = (k+l)-L$, where:

$$n = \begin{cases} n & \text{if } 0 \le n \le (L-2) \\ 0 & \text{else} \end{cases}$$

$h^{kl}_{01} = L_1(n) - h^{kl}_{00} - h^{kl}_{02}$ with $n = L-1-l$ $h^{kl}_{10} = L_1(n) - h^{kl}_{00} - h^{kl}_{20}$ with $n = L-1-k$ $h^{kl}_{12} = L_1(n) - h^{kl}_{02} - h^{kl}_{22}$ with $n = k$ $h^{kl}_{21} = L_1(n) - h^{kl}_{20} - h^{kl}_{22}$ with $n = l$ $h^{kl}_{11} = L^2 - h^{kl}_{00} - h^{kl}_{01} - h^{kl}_{02} - h^{kl}_{10} - h^{kl}_{12} - hl_{20} - h^{kl}_{21} - h^{kl}_{22}$.

Figure 6:
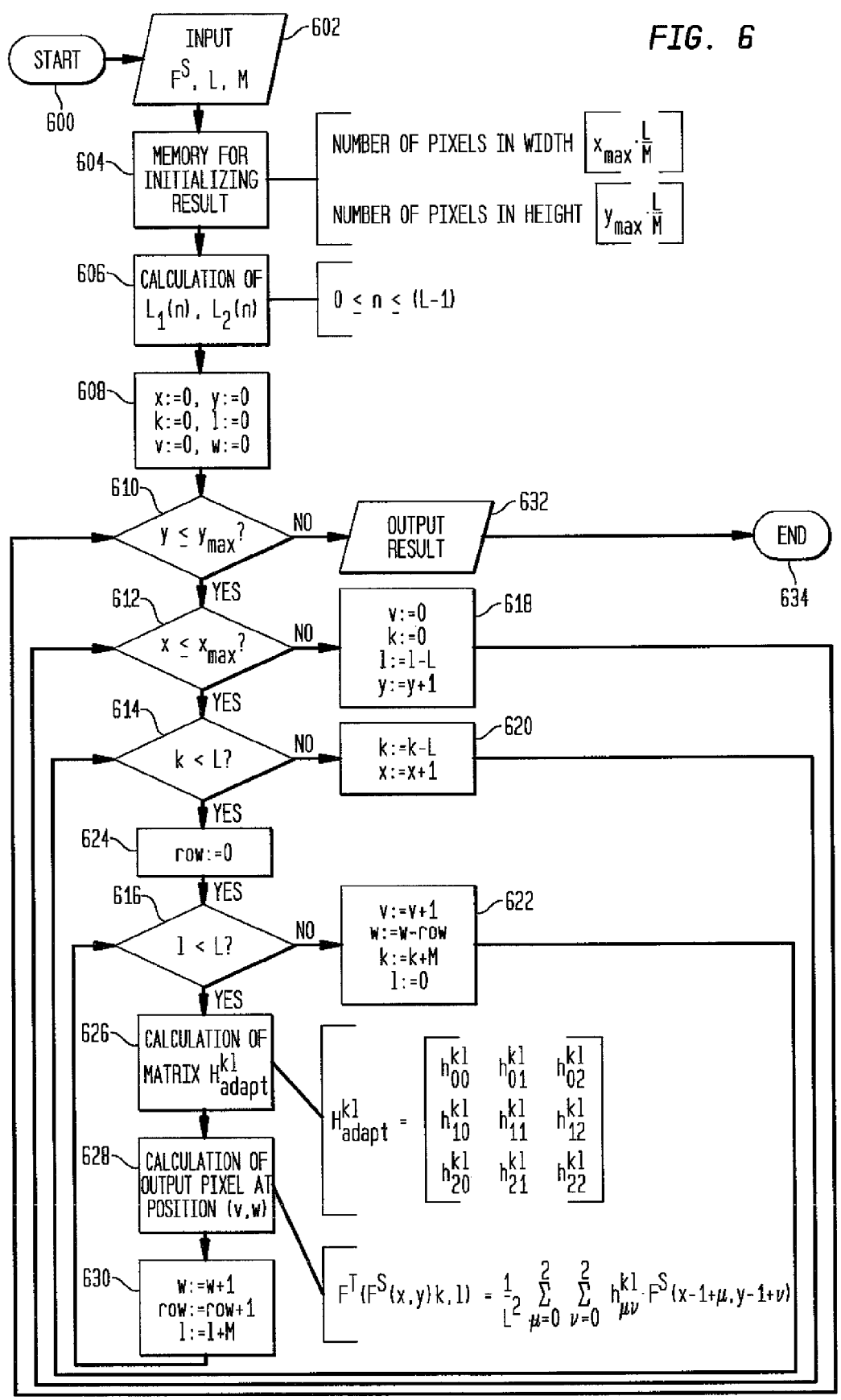
FIG. 6 shows a flow diagram of an exemplified embodiment of the scaling method.

With the help of FIG. 6 a exemplified embodiment of the inventive scaling method is described. According to this embodiment, the pixel $F^S(x, y)$ of the source image 100 are evaluated column by column. The method starts in step 600. In step 602 the source image 100 and the values L and M of the scaling factor L/M are read in. In the next step 604 storage for the target image 200 is provided.

The process proceeds to step 606, where the values $L_1(n)$ and $L_2(n)$ are determined.

Next, in step 608 start values for the pixels $F^S(x, y)$ of the source image 100, of the phase k, l, and the pixels $F^T(v,w)$ to be calculated are defined.

With the steps 610, 612, 614 and 616 it is checked whether the phase is still in the same pixel $F^S(x, y)$ of the source image 100 (steps 614 and 616), and whether the last row or last column of the source image 100 is reached by the process (steps 610 and 612). In steps 618, 620, 622 and 624 the parameter x, y, k, l, m and n are adapted accordingly. A parameter 'row' is used for indicating whether all needed sub-pixel of a pixel $F^S(x, y)$ of the source image 100 are evaluated.

In step 626 the matrix $H^{kl}_{adapt}$ corresponding to the current phase is calculated, and then in step 628 the pixel $F^T(v, w)$ of the target image 200 is calculated using equation (1). In step 630 some parameter are increased.

After all pixels $F^S(x, y)$ of the source image 100 are evaluated, the target image 200 is outputted in step 632, and the transformation ends in step 634.

It should be noted that steps 606 and 626 may be executed in advance. In this case, the matrices $H^{kl}_{adapt}$ are stored in a storage area, and are only read from this storage area according to the current phase in step 628, where the pixel $F^T(v, w)$ of the target image 200 is calculated, therefore preventing new calculation in each loop.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated. A number of variations are feasible which make use of the method, arrangement, computer program and computer-readable storage medium of the invention even with fundamentally different implementations.

What is claimed as new and desired to be protected by Letters Patent is set forth in the appended claims and includes equivalents of the elements recited therein:

What is claimed is:

1. A method for scaling two-dimensional structures with a scaling factor, wherein a source structure is transformed into a target structure and the source and target structure are each constructed from regularly arranged structure elements, the method comprising:

defining a first scheme comprising structure elements $P_{ij}$ associated with the source structure and arranged in m rows and n columns, subdividing at least a portion of the structure elements $P_{ij}$ of the first scheme into sub-structure elements arranged in p rows and q columns, with each row and each column having a corresponding sub-structure element $P^S_{kl}$, defining a second scheme $P^D$ comprising a subset of the sub-structure elements $P^S_{kl}$, and at least one distinguished sub-structure element $P^{D*}$, superposing the first scheme with the second scheme $P^D$ so as to overlap the at least one distinguished sub-structure element $P^{D*}$ step-by-step with at least a portion of the sub-structure elements $P^S_{kl}$ of the first scheme, for each step of superposing, constructing a coefficient matrix $H^{kl}_{adapt}$ having a dimension that is independent of the scaling factor and that is assigned to the sub-structure element $P^S_{kl}$ of the first scheme, with which the distinguished sub-structure element $P^{D*}$ is overlapped, wherein the coefficients $h^{kl}_{ij}$ of the coefficient matrix $H^{kl}_{adapt}$ define a weight of the structure element $P_{ij}$ of the i-th row and j-th column of the first scheme, and defining a structure element of the target structure by evaluating at least a portion of the structure elements $P_{ij}$ of the first scheme and at least a portion of the matrices $H^{kl}_{adapt}$.

2. The method according to claim 1, further comprising a scaling factor which defines at least a parameter p and q of the subdivided sub-structure elements and a step size of the step-by-step overlap.

3. The method according to claim 1, wherein the weight indicates a measurement of the area of the structure element $P_{ij}$ of the i-th row and j-th column of the first scheme covered by sub-structure elements $P^D_{kl}$ of the second scheme $P^D$.

4. The method according to claim 3, wherein the measurement of the covered area of the structure element $P_{ij}$ of the first scheme is defined as a number of sub-structure elements $P^S_{kl}$ within the structure element $P_{ij}$ that overlap with sub-structure elements $P^D_{kl}$, of the second scheme $P^D$.

5. The method according to claim 1, wherein at least a portion of the structure elements $P_{ij}$ of the first scheme corresponds to a block of m rows and n columns of adjacent structure elements of the source structure.

6. The method according to claim 1, wherein the structure element of the target structure are weighted by the coefficients $h^{kl}_{ij}$ of the coefficient matrix $H^{kl}_{adapt}$.

7. The method according to claim 1, wherein the coefficients $h^{kl}_{ij}$ of the coefficient matrix $H^{kl}_{adapt}$ are stored in a storage area of a data processing unit.

8. The method according to claim 7, wherein the coefficients $h^{kl}_{ij}$ of the coefficient matrix $H^{kl}_{adapt}$ are stored in at least one lookup table.

9. The method according to claim 1, wherein the second scheme $P^D$ is defined as diamond-shaped filter.

10. A data processing unit configured to carry out a method for scaling two-dimensional structures with a scaling factor, wherein a source structure is transformed into a target structure and the source and target structure are each constructed from regularly arranged structure elements, by:

defining a first scheme comprising structure elements $P_{ij}$ associated with the source structure and arranged in m rows and n columns, subdividing at least a portion of the structure elements $P_{ij}$ of the first scheme into sub-structure elements arranged in p rows and q columns, with each row and each column having a corresponding sub-structure element $P^S_{kl}$, defining a second scheme $P^D$ comprising a subset of the sub-structure elements $P^S_{kl}$ and at least one distinguished sub-structure element $P^{D*}$, superposing the first scheme with the second scheme $P^D$ so as to overlap the at least one distinguished sub-structure element $P^{D*}$ step-by-step with at least a portion of the sub-structure elements $P^S_{kl}$ of the first scheme, for each step of superposing, constructing a coefficient matrix $H^{kl}_{adapt}$ having a dimension that is independent of the scaling factor and that is assigned to the sub-structure element $P^S_{kl}$ of the first scheme, with which the distinguished sub-structure element $P^{D*}$ is overlapped, wherein the coefficients $h^{kl}_{ij}$ of the coefficient matrix $H^{kl}_{adapt}$ define a weight of the structure element $P_{ij}$ of the i-th row and j-th column of the first scheme, and defining a structure element of the target structure by evaluating at least a portion of the structure elements $P_{ij}$ of the first scheme and at least a portion of the matrices $H^{kl}_{adapt}$.

11. A computer program stored on a non-transitory medium and having computer program instruction which enable a computer, after the computer program is loaded into a memory of the computer, to execute a method for scaling two-dimensional structures with a scaling factor, wherein a source structure is transformed into a target structure and the source and target structure are each constructed from regularly arranged structure elements, by:

defining a first scheme comprising structure elements $P_{ij}$ associated with the source structure and arranged in m rows and n columns, subdividing at least a portion of the structure elements $P_{ij}$ of the first scheme into sub-structure elements arranged in p rows and q columns, with each row and each column having a corresponding sub-structure element $P^S_{kl}$, defining a second scheme $P^D$ comprising a subset of the sub-structure elements $P^S_{kl}$ and at least one distinguished sub-structure element $P^{D*}$, superposing the first scheme with the second scheme $P^D$ so as to overlap the at least one distinguished sub-structure element $P^{D*}$ step-by-step with at least a portion of the sub-structure elements $P^S_{kl}$ of the first scheme, for each step of superposing, constructing a coefficient matrix $H^{kl}_{adapt}$ having a dimension that is independent of the scaling factor and that is assigned to the sub-structure element $P^S_{kl}$ of the first scheme, with which the distinguished sub-structure element $P^{D*}$ is overlapped, wherein the coefficients $h^{kl}_{ij}$ of the coefficient matrix $H^{kl}_{adapt}$ define a weight of the structure element $P_{ij}$ of the i-th row and j-th column of the first scheme, and defining a structure element of the target structure by evaluating at least a portion of the structure elements $P_{ij}$ of the first scheme and at least a portion of the matrices $H^{kl}_{adapt}$.

12. A non-transitory computer-readable storage medium having a computer program stored thereon which enables a computer, after the computer program is loaded in a memory of the computer, to execute a method for scaling two-dimensional structures with a scaling factor, wherein a source structure is transformed into a target structure and the source and target structure are each constructed from regularly arranged structure elements, by defining a first scheme comprising structure elements $P_{ij}$ associated with the source structure and arranged in m rows and n columns, subdividing at least a portion of the structure elements $P_{ij}$ of the first scheme into sub-structure elements arranged in p rows and q columns, with each row and each column having a corresponding sub-structure element $P^S_{kl}$, defining a second scheme $P^D$ comprising a subset of the sub-structure elements $P^S_{kl}$ and at least one distinguished sub-structure element $P^{D*}$, superposing the first scheme with the second scheme $P^D$ so as to overlap the at least one distinguished sub-structure element $P^{D*}$ step-by-step with at least a portion of the sub-structure elements $P^S_{kl}$ of the first scheme, for each step of superposing, constructing a coefficient matrix $H^{kl}_{adapt}$ having a dimension that is independent of the scaling factor and that is assigned to the sub-structure element $P^S_{kl}$ of the first scheme, with which the distinguished sub-structure element $P^{D*}$ is overlapped, wherein the coefficients $h^{kl}_{ij}$ of the coefficient matrix $H^{kl}_{adapt}$ define a weight of the structure element $P_{ij}$ of the i-th row and j-th column of the first scheme, and defining a structure element of the target structure by evaluating at least a portion of the structure elements $P_{ij}$ of the first scheme and at least a portion of the matrices $H^{kl}_{adapt}$.

* * * * *